United States Patent
McGhee et al.

(10) Patent No.: US 6,658,049 B1
(45) Date of Patent: Dec. 2, 2003

(54) XDSL REPEATER SYSTEM AND METHOD

(75) Inventors: David W. McGhee, Austin, TX (US); Richard L. House, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/228,688

(22) Filed: Jan. 12, 1999

(51) Int. Cl.[7] .......................... H04B 17/02; H04B 3/36; H04B 7/17; H04C 25/20; H04C 25/52
(52) U.S. Cl. ........................ 375/211; 375/222; 370/492
(58) Field of Search .................. 375/259, 260, 375/285, 211, 219, 220, 254, 296, 346, 348, 350, 227, 222; 379/417; 370/201, 203, 210, 352, 484, 487, 492, 494

(56) References Cited

U.S. PATENT DOCUMENTS

| | | | |
|---|---|---|---|
| 3,532,827 A | 10/1970 | Ewin | 179/18 |
| 3,821,484 A | 6/1974 | Sternung et al. | 179/18 EB |
| 4,002,849 A | 1/1977 | Kotler et al. | 179/18 EB |
| 4,282,408 A | 8/1981 | Stauers | 179/18 FA |
| 4,438,511 A | 3/1984 | Baran | 370/19 |
| 4,665,514 A | 5/1987 | Ching et al. | 370/60 |
| 4,679,227 A | 7/1987 | Hughes-Hartogs | 379/98 |
| 4,731,816 A | 3/1988 | Hughes-Hartogs | 379/98 |
| 4,757,495 A | 7/1988 | Decker et al. | 370/76 |
| 4,782,512 A | 11/1988 | Hutton | 379/98 |
| 4,833,706 A | 5/1989 | Hughes-Hartogs | 379/98 |
| 4,841,561 A | 6/1989 | Hill | 379/97 |
| 4,949,355 A | 8/1990 | Dyke et al. | 375/10 |
| 4,980,897 A | 12/1990 | Decker et al. | 375/38 |
| 5,025,469 A | 6/1991 | Bingham | 379/98 |
| 5,054,034 A | 10/1991 | Hughes-Hartogs | 375/8 |
| 5,119,402 A | 6/1992 | Ginzburg et al. | 375/17 |
| 5,134,611 A | 7/1992 | Steinka et al. | 370/79 |
| 5,185,763 A | 2/1993 | Krishnan | 375/39 |
| 5,198,818 A | 3/1993 | Samueli et al. | 341/144 |

(List continued on next page.)

FOREIGN PATENT DOCUMENTS

| | | |
|---|---|---|
| JP | 62084646 | 4/1987 |
| JP | 62222755 | 9/1987 |
| JP | 6376648 | 4/1988 |
| JP | 02271763 | 11/1990 |
| JP | 04100367 | 4/1992 |
| WO | WO 86/02796 | 5/1986 |
| WO | WO 97/37458 | 10/1997 |

OTHER PUBLICATIONS

Horst Hessenmüller, et al., Zugangsnetzstrukturen für interaktive Videodienste (Teil 1), *Fernmelde Ingenieur, Der*, vol. 48, No. 8, XP000647017, Aug., 1994, Germany, pp. 1–32 (with English translation).

Horst Hessenmüller, et al., Zugangsnetzstrukturen für interaktive Videodienste (Teil 2), *Fernmelde–Ingenieur*, vol. 48, No. 9, XP000619688, Sep., 1994, Germany, pp. 1–28 (with English translation).

*Primary Examiner*—Chi Pham
*Assistant Examiner*—Demetria Williams
(74) *Attorney, Agent, or Firm*—Baker Botts L.L.P.

(57) ABSTRACT

A system for repeating an xDSL signal (14) is disclosed. The system comprises a receiver (16) operable to receive the xDSL signal (14), a first analog front end (18) coupled to the receiver (16) and operable to convert the xDSL signal to a digital signal, and a series of digital signal processors (20, 22) coupled to the first analog front end (18) and operable to remove noise elements from the digital signal. Also provided is a second analog front end (24) coupled to the second digital signal processor (22) and operable to convert the digital signal back to the analog domain. A driver circuit (26) is operable to increase the signal strength of the analog signal and retransmits it over a new length of wiring.

12 Claims, 1 Drawing Sheet

U.S. PATENT DOCUMENTS

| | | | | |
|---|---|---|---|---|
| 5,199,071 | A | 3/1993 | Abe et al. | 379/38 |
| 5,202,884 | A | 4/1993 | Close et al. | 370/94.1 |
| 5,206,886 | A | 4/1993 | Bingham | 375/97 |
| 5,214,650 | A | 5/1993 | Renner et al. | 370/110.1 |
| 5,222,077 | A | 6/1993 | Krishnan | 375/39 |
| 5,228,062 | A | 7/1993 | Bingham | 375/97 |
| 5,247,347 | A | 9/1993 | Litteral et al. | 358/85 |
| 5,282,155 | A | 1/1994 | Jones | 364/724.19 |
| 5,285,474 | A | 2/1994 | Chow et al. | 375/13 |
| 5,293,402 | A | 3/1994 | Crespo et al. | 375/14 |
| 5,295,159 | A | 3/1994 | Kerpez | 375/38 |
| 5,331,670 | A | 7/1994 | Sorbara et al. | 375/111 |
| 5,337,348 | A | 8/1994 | Yamazaki et al. | 379/94 |
| 5,339,355 | A | 8/1994 | Mori et al. | 379/94 |
| 5,341,474 | A | 8/1994 | Gelman et al. | 395/200 |
| 5,345,437 | A | 9/1994 | Ogawa | 370/13 |
| 5,367,540 | A | 11/1994 | Kakuishi et al. | 375/103 |
| 5,371,532 | A | 12/1994 | Gelman et al. | 348/7 |
| 5,379,441 | A | 1/1995 | Watanabe et al. | 395/800 |
| 5,390,239 | A | 2/1995 | Morris et al. | 379/93 |
| 5,400,322 | A | 3/1995 | Hunt et al. | 370/19 |
| 5,404,388 | A | 4/1995 | Eu | 379/24 |
| 5,408,260 | A | 4/1995 | Arnon | 348/6 |
| 5,408,522 | A | 4/1995 | Ikehata et al. | 379/98 |
| 5,408,614 | A | 4/1995 | Thornton et al. | 395/275 |
| 5,410,264 | A | 4/1995 | Lechleider | 327/311 |
| 5,410,343 | A | 4/1995 | Coddington et al. | 348/7 |
| 5,414,455 | A | 5/1995 | Hooper et al. | 348/7 |
| 5,414,733 | A | 5/1995 | Turner | 375/233 |
| 5,422,876 | A | 6/1995 | Turudic | 370/15 |
| 5,428,608 | A | 6/1995 | Freeman et al. | 370/60.1 |
| 5,430,793 | A | 7/1995 | Ueltzen et al. | 379/93 |
| 5,440,335 | A | 8/1995 | Beveridge | 348/13 |
| 5,442,390 | A | 8/1995 | Hooper et al. | 348/7 |
| 5,453,779 | A | 9/1995 | Dan et al. | 348/7 |
| 5,461,415 | A | 10/1995 | Wolf et al. | 348/7 |
| 5,461,616 | A | 10/1995 | Suzuki | 370/79 |
| 5,461,640 | A | 10/1995 | Gatherer | 375/231 |
| 5,469,495 | A | 11/1995 | Beveridge | 379/56 |
| 5,475,735 | A | 12/1995 | Williams et al. | 379/59 |
| 5,477,263 | A | 12/1995 | O'Callaghan et al. | 348/7 |
| 5,479,447 | A | 12/1995 | Chow et al. | 375/260 |
| 5,495,483 | A | 2/1996 | Grube et al. | 370/95.1 |
| 5,504,736 | A | 4/1996 | Cubbison, Jr. | 370/13 |
| 5,504,753 | A | 4/1996 | Renger et al. | 371/20.1 |
| 5,506,868 | A | 4/1996 | Cox et al. | 375/222 |
| 5,513,251 | A | 4/1996 | Rochkind et al. | 379/93 |
| 5,521,949 | A | * 5/1996 | Huang et al. | 375/298 |
| 5,528,585 | A | 6/1996 | Cooley et al. | 370/56 |
| 5,546,379 | A | 8/1996 | Thaweethai et al. | 370/17 |
| 5,555,244 | A | 9/1996 | Gupta et al. | 370/60.1 |
| 5,574,724 | A | 11/1996 | Bales et al. | 370/68.1 |
| 5,583,872 | A | 12/1996 | Albrecht et al. | 370/476 |
| 5,598,406 | A | 1/1997 | Albrecht et al. | 370/296 |
| 5,600,712 | A | 2/1997 | Hanson et al. | 379/142 |
| 5,602,902 | A | 2/1997 | Satterlund et al. | 379/59 |
| 5,631,897 | A | 5/1997 | Pacheco et al. | 370/237 |
| 5,649,001 | A | 7/1997 | Thomas et al. | 379/93.07 |
| 5,668,857 | A | 9/1997 | McHale | 379/93.07 |
| 5,678,004 | A | 10/1997 | Thaweethai | 595/187.01 |
| 5,687,176 | A | 11/1997 | Wisniewski et al. | 370/476 |
| 5,737,364 | A | 4/1998 | Cohen et al. | 375/220 |
| 5,756,280 | A | 5/1998 | Soora et al. | 455/4.2 |
| 5,757,803 | A | * 5/1998 | Russell et al. | 370/494 |
| 5,770,950 | A | 6/1998 | Zurcher et al. | 326/30 |
| 5,781,617 | A | 7/1998 | McHale et al. | 379/93.14 |
| 5,799,017 | A | 8/1998 | Gupta et al. | 370/419 |
| 5,812,786 | A | 9/1998 | Seazholtz et al. | 395/200.63 |
| 5,852,655 | A | 12/1998 | McHale et al. | 379/93.14 |
| 6,021,120 | A | * 2/2000 | Beyda et al. | 370/282 |
| 6,282,189 | B1 | * 8/2001 | Eames | 370/352 |
| 6,466,588 | B1 | * 10/2002 | Michaels | 375/220 |

* cited by examiner

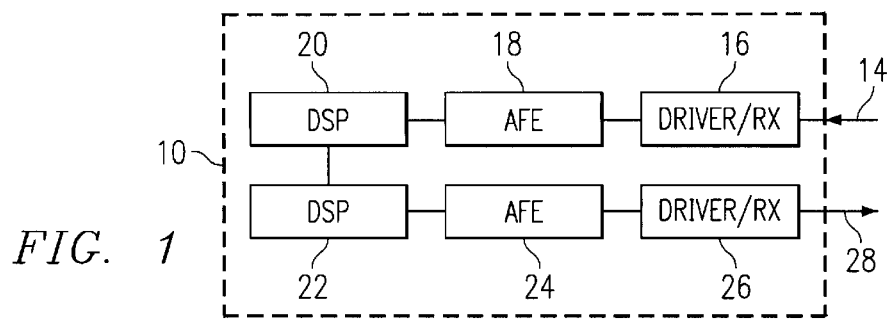
FIG. 1
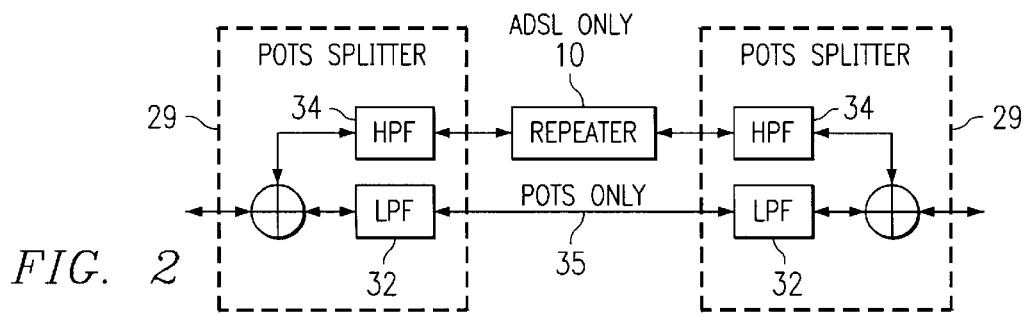
FIG. 2
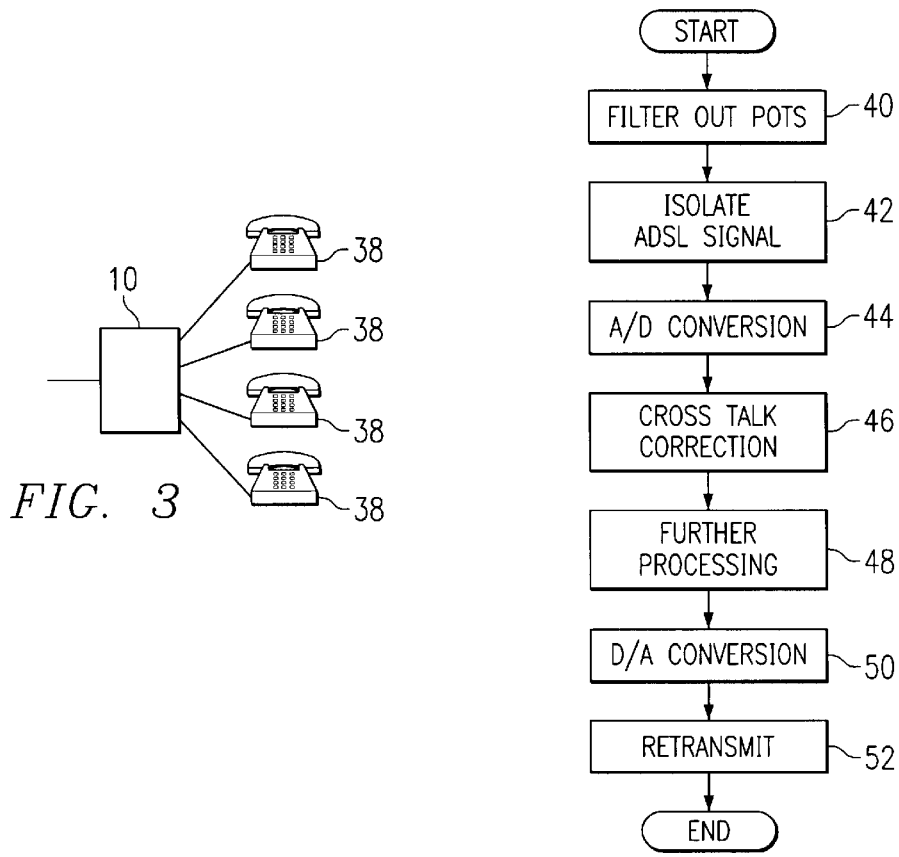
FIG. 3
FIG. 4

1

XDSL REPEATER SYSTEM AND METHOD

TECHNICAL FIELD OF THE INVENTION

This invention relates to the field of telecommunication and more specifically to an xDSL repeater system and method.

BACKGROUND OF THE INVENTION

As demand for broadband services, such as high speed Internet access and on-demand video to the home increases, the need for technologies that can transmit large bandwidths of information also increases.

One technology being introduced to fill this need is digital subscriber lines (xDSL). The advantage of xDSL over other broadband technologies such as fiber optics to the home or cable modems is that it uses the existing twisted pair copper lines that already provide telephone services to homes.

The term xDSL is a catchall term covering a number of similar technologies. These include High bit rate Digital Subscriber Line (HDSL) and Asymmetric Digital Subscriber Line (ADSL).

HDSL is designed to deliver T1 (1.544 Mbps) and E1 (2.048 Mbps) services over conventional copper lines by using transceivers on each end of two or three twisted pairs. Single pair HDSL is limited to 384 Kbps or 768 Kbps symmetrical speeds.

ADSL uses conventional twisted pair copper lines to provide a large downstream path and a smaller upstream path. This allows for services such as on demand video and high speed Internet access where the user needs to receive greater bandwidth than the user needs to send. In one embodiment, ADSL is capable of providing downstream rates in excess of 6 Mbps and simultaneous duplex transmissions of 640 Kbps. Several competing ADSL standards exist. These include Discrete Multitone (DMT) and Carrierless Amplitude and Phase modulation (CAP). In one embodiment, DMT divides the 1 MHZ phone line spectrum into 256 4 KHz channels. Transmission bit density can be varied to overcome noise and interference.

CAP uses a single carrier and utilizes amplitude modulation similar to that used for modems to achieve ADSL transmission.

Both DMT and CAP operate by placing an ADSL modem on either end of a twisted-pair telephone line (one at a central office and the other at the customer's home or office). Three channels are created: a POTS (plain old telephone service) channel, a medium speed duplex channel and a high speed downstream channel. In a typical embodiment, POTS takes up the first 4 KHz of the phone line spectrum. The medium speed duplex channel and the high speed downstream channel occupy higher frequencies in the spectrum. Since the POTS channel is located in the first 4 KHz of the spectrum it can be split off from the data channels by filtering, thus providing an uninterrupted POTS connection.

One drawback of xDSL systems is that transmission signals attenuate as line length increases. For example, in order to maintain a downstream rate of around 6 Mbps the maximum loop length of copper is 12,000 Feet. This drawback limits the number of homes that can access xDSL service.

SUMMARY OF THE INVENTION

Accordingly, a need has arisen for an xDSL Repeater System and Method. The present invention includes a system and method that provides a xDSL repeater that addresses the shortcoming of prior systems and methods.

According to one embodiment of the invention, a system for repeating an xDSL signal is provided. The system is comprised of two receiver/transmitters. The receivers consists of an analog front end which amplifies and converts the analog signal to the digital domain. The digital data is passed to a digital signal processor which is responsible for time and frequency domain equalization, echo cancellation, and decoding the signal. The transmitters take the decoded data and encode the data, transfer it to the analog front end where it is converted to an analog signal, amplified, and sent down the remainder of the cable to the far end transceiver. Also, a replica of the transmitted signal is transferred to the receiver DSP to remove crosstalk that is induced on the line when the powerful transmitted signal leaves the repeater adjacent to the weaker received signal.

The present invention provides various technical advantages. For example, a repeater is provided that allows for xDSL to reach further distances. Other technical advantages may be readily apparent to one skilled in the art from the following figures, descriptions and claims.

BRIEF DESCRIPTION OF THE DRAWINGS

For a more complete understanding of the present invention and advantages thereof, reference is now made to the following descriptions taken in conjunction with the following drawings, in which like numbers represent like parts, in which:

FIG. 1 illustrates an xDSL repeater in accordance with the teachings of the present invention;

FIG. 2 illustrates a high pass filter with a repeater in accordance with the teaching of the present invention;

FIG. 3 illustrates an alternative embodiment of the present invention; and,

FIG. 4 is a flowchart illustrating the operation of the present invention.

DETAILED DESCRIPTION OF THE INVENTION

Embodiments of the present invention and its advantages are best understood by referring to FIGS. 1 through 4 of the drawings, like numerals being used for like and corresponding parts of the various drawings.

FIG. 1 illustrates a xDSL repeater in accordance with the teaching of the present invention. xDSL repeater 10 comprises a first driver/receiver 16 coupled to a first analog front end 18 coupled to a first digital signal processor (DSP) 20 which is coupled to second DSP 22 which is in turn coupled to a second analog front end 24 which is coupled to a second driver/receiver 26. FIG. 1 is a schematic drawing showing operational blocks for each, the various functional blocks could actually be implemented as one or more components in an actual embodiment.

In operation, a xDSL signal 14 is received by driver/receiver 16. Driver/receiver 16 then passes the signal to analog front end 18 which converts the analog signal to a digital signal in order for it to be processed by first DSP 20. First DSP 20 receives the digital signal from analog front end 18.

First DSP 20 and second DSP 22 are operable, either singularly or together, to eliminate crosstalk and other noise which can occur in a repeater system. Crosstalk occurs when there is a signal delay in a repeater which is a replica of the regenerated signal that overlays the transmitted signal.

Typically, the longer the loop length, the worse crosstalk can be. Crosstalk also can occur when a bundle of twisted pair wires are provided together. In this case, crosstalk occurs between the different wires in a bundle. First DSP 20 can eliminate crosstalk by monitoring what signal exits second DSP 22 and then finding a preset delay to produce a replica of the transmitted signal (crosstalk) to be subtracted from the received signal. As an alternate, the first DSP 20 can take the received signal, generate its own version of the crosstalk replica and subtract the delayed version from its own input.

Aside from handling crosstalk, DSP 20 and 22 can also perform other signal processing chores such as time or frequency domain transformations, block error corrections using algorithms such as the Reed-Solomon algorithm, or bit error corrections using a Viterbi algorithm or other bit correcting algorithms. These can be done for noise reduction purposes.

After DSPs 20 and 22 have eliminated crosstalk and performed other signal processing chores, the signal is sent to second analog front end 24. Analog front end 24 converts the digital signal back to an analog signal which is then sent to driver 26. Driver 26 then transmits the regenerated signal 28 over the next loop of twisted pair wires.

In some cases of extreme crosstalk, analog front end 18 may need to be used to reduce crosstalk in the analog domain by subtracting the analog replica of the outgoing signal.

Additionally, since xDSL lines are capable of carrying a POTS signal, it is important to split off the POTS signal before sending the signal into repeater 10. FIG. 2 illustrates an exemplary system to filter out POTS signals. POTS Splitter 29 comprises a low pass filter 32 which will allow only frequencies below a certain level to pass. Low pass filter is chosen to allow only the POTS signal to travel along line 35. POTS splitters 29 are set up on either side of repeater 10 and line 35 since communication can travel in either direction. POTS splitter 29 optionally includes a high pass filter 34 placed before the repeater to ensure only frequencies above the POTS frequency is sent to repeater 10.

FIG. 3 illustrates another embodiment of the present invention. In FIG. 3 the incoming digital signal 14 is sent to repeater 10. In this case, repeater 10 is operable to repeat the signal at lower bandwidth rates and send them along different paths to individual homes 38. This acts like a multiplexer. Like a repeater, it also provides a longer line length, albeit it at a lower transmit and receive rate than a single xDSL loop would have. For example, a six megabit per second link could be divided among several households at a lower rate such as a 750 KHz downstream rate for each home. This approach can also be used in apartment complexes where one xDSL link could be used to provide many subscribers in different apartments with slower rate xDSL lines.

FIG. 4 is a flow chart illustrating the operation of the present invention. As execution of the flow chart begins in step 40, the POTS line is filtered out. As discussed before, this can be done by means of a high pass filter or other filtering techniques to remove lower frequency POTS line from the upstream and downstream data signals of xDSL. In step 42, the xDSL signal is isolated. Then, in step 44, the analog front end completes an analog digital conversion converting the analog data signals into the digital domain. Crosstalk is canceled by DSPs 20 and 22 in step 46. This can be done as discussed before in several different ways.

The signal is then further processed in step 48. This further processing can include error correction via a block-ing coding process such as a Reed-Solomon process or a bit incrementing process such as that done in Viterbi analysis. Also, time or frequency based transforms may be done for signal processing purposes. Then, in step 50, the digital signal is converted back to the analog domain and in analog front end. Finally, in step 52, the signal is then boosted using driver 26 and the now analog signal is repeated and sent over a new loop of twisted pair copper wiring until it reaches either a customer presence equipment or another repeater.

Although the present invention has been describe in detail, it should be understood that various changes, substitutions and alterations can be made thereto without departing from the spirit and scope of the invention as defined by the appended claims.

What is claimed is:

1. A method for repeating an xDSL signal comprising the steps of:
   isolating the xDSL signal;
   converting the xDSL signal into a digital signal;
   removing noise elements;
   converting the signal back to an analog signal;
   retransmitting the signal; and
   wherein the step of removing noise elements comprises removing crosstalk by formulating an appropriately delayed signal image.

2. A method for repeating an xDSL signal comprising the steps of:
   isolating the xDSL signal;
   converting the xDSL signal into a digital signal;
   removing noise elements;
   converting the signal back to an analog signal;
   retransmitting the signal; and
   wherein the step of removing noise elements comprises performing bit error corrections.

3. A system for repeating an xDSL signal comprising:
   a receiver operable to receive the xDSL signal;
   a first analog front end coupled to the receiver and operable to convert the xDSL signal to a digital signal;
   a series of digital signal processors coupled to the first analog front end and operable to remove noise elements from the digital signal;
   a second analog front end coupled to each digital signal processor and operable to convert the digital signal back to an analog xDSL signal; and
   a driver circuit coupled to each analog front end and operable to increase the signal strength of the analog xDSL signal and retransmit it over a new length of wiring.

4. The system of claim 3, wherein a POTS signal is removed before noise elements are removed.

5. The system of claim 3, wherein the digital signal processors are operable to remove noise elements by removing crosstalk by formulating an appropriately delayed replica.

6. The system of claim 3, wherein the digital signal processors are operable to perform block error corrections.

7. The system of claim 3, wherein the digital signal processors are operable to perform bit error corrections.

8. The system of claim 3, wherein the first and second analog front ends are operable to remove crosstalk.

9. The system of claim 3, wherein the xDSL signal is an ADSL signal.

10. A system for repeating an xDSL signal comprising:
    a receiver operable to receive the xDSL signal;

a first analog front end coupled to the receiver and operable to convert the xDSL signal to a digital signal;

a series of digital signal processors coupled to the first analog front end and operable to remove noise elements from the digital signal;

a second analog front end coupled to each digital signal processor and operable to convert the digital signal back to the analog domain;

a driver circuit coupled to each analog front end and operable to increase the signal strength of the analog signal and retransmit it over a new length of wiring; and wherein the digital signal processors are operable to remove noise elements by removing crosstalk by formulating an appropriately delayed replica.

11. A system for repeating an xDSL signal comprising:

a receiver operable to receive the xDSL signal;

a first analog front end coupled to the receiver and operable to convert the xDSL signal to a digital signal;

a series of digital signal processors coupled to the first analog front end and operable to remove noise elements from the digital signal;

a second analog front end coupled to each digital signal processor and operable to convert the digital signal back to the analog domain;

a driver circuit coupled to each analog front end and operable to increase the signal strength of the analog signal and retransmit it over a new length of wiring; and wherein the digital signal processors are operable to perform bit error corrections.

12. A system for repeating an xDSL signal comprising:

a receiver operable to receive the xDSL signal;

a first analog front end coupled to the receiver and operable to convert the xDSL signal to a digital signal;

a series of digital signal processors coupled to the first analog front end and operable to remove noise elements from the digital signal;

a second analog front end coupled to each digital signal processor and operable to convert the digital signal back to the analog domain;

a driver circuit coupled to each analog front end and operable to increase the signal strength of the analog signal and retransmit it over a new length of wiring; and wherein the first and second analog front ends are operable to remove crosstalk.

\* \* \* \* \*